United States Patent [19]
O'Neil et al.

[11] Patent Number: 5,168,391
[45] Date of Patent: Dec. 1, 1992

[54] DYE LASER AMPLIFIER INCLUDING AN IMPROVED WINDOW CONFIGURATION FOR ITS DYE BEAM

[75] Inventors: Richard W. O'Neil, Pleasanton; James M. Davin, Livermore, both of Calif.

[73] Assignee: The United States of America as represented by the United States Department of Energy, Washington, D.C.

[21] Appl. No.: 911,194

[22] Filed: Sep. 22, 1986

[51] Int. Cl.$^5$ ............................................. H01S 3/00
[52] U.S. Cl. ...................................... 359/333; 372/53
[58] Field of Search .......................... 372/53, 54, 103; 330/4.3

[56] References Cited

U.S. PATENT DOCUMENTS

| | | | |
|---|---|---|---|
| 3,541,470 | 3/1967 | Lankard et al. | 372/53 |
| 3,707,687 | 12/1972 | Hercher et al. | 372/53 |
| 3,725,810 | 4/1973 | Ashkin et al. | 372/54 X |
| 3,805,187 | 4/1974 | Lempicki et al. | 372/53 |
| 3,835,417 | 9/1974 | Shafer | 372/53 |
| 3,872,403 | 3/1975 | Pilloff | 372/54 |
| 3,890,578 | 6/1975 | Wang | 372/53 |
| 3,913,033 | 10/1975 | Tuccio et al. | 372/53 |
| 4,099,131 | 7/1978 | Pike | 372/53 |
| 4,296,388 | 10/1981 | Draggoo | 372/53 |
| 4,627,068 | 12/1986 | Johnson et al. | 372/54 X |

OTHER PUBLICATIONS

Brughera et al., "A New Kind of Dye Laser: Technical Problems and Solutions Adopted", vol. 44, No. 8, pp. 475–476, Aug. 1975, Associazone Elettrotenica ed Elettronica Italiana.

*Primary Examiner*—Mark Hellner
*Attorney, Agent, or Firm*—Miguel A. Valdes; Henry P. Sartorio; William R. Moser

[57] ABSTRACT

A dye laser amplifier in which a continuously replenished supply of dye is excited with a first light beam in order to amplify the intensity of a second different light beam passing therethrough is disclosed herein. This amplifier includes a cell though which a continuous stream of the dye is caused to pass, and means for directing the first beam into the cell while the second beam is directed into and through the same cell. There is also disclosed herein a specific improvement to this amplifier which resides in the use of a pair of particularly configured windows through which the second beam passes along fixed paths as the second beam enters and exits the dye cell. Each of these windows has a relatively thick main section which is substantially larger in dimensions transverse to its beam path than the cross section of the second beam itself, whereby to add structural integrity to the overall window. At the same time, the latter includes a second section which is disposed entirely within the confines of the main section and through which the second beam is intended to pass in its entirety. This second section is made substantially thinner than the main section in order to reduce optical distortion as the second beam passes therethrough.

13 Claims, 1 Drawing Sheet

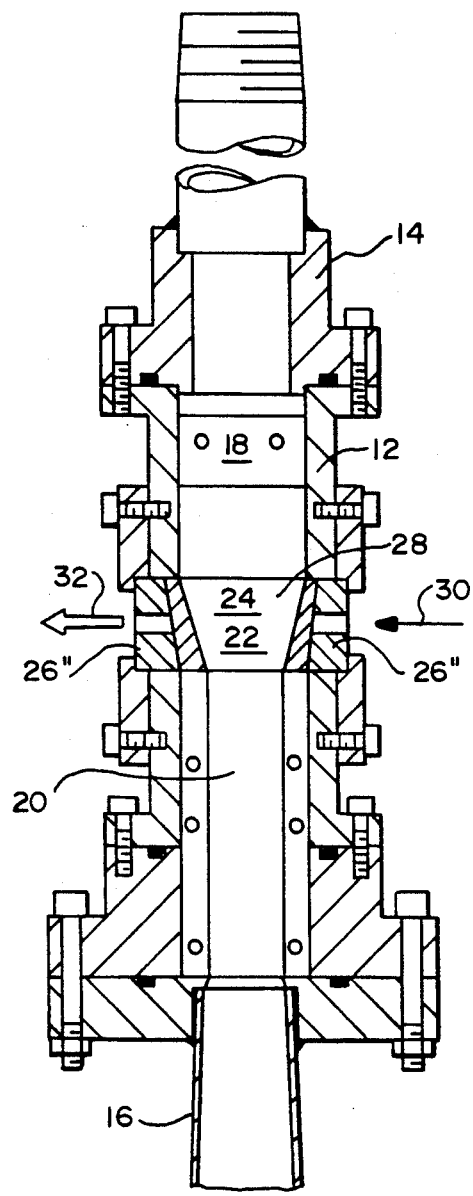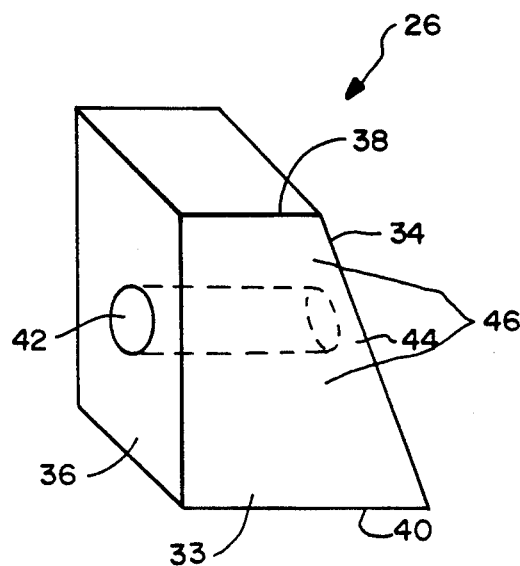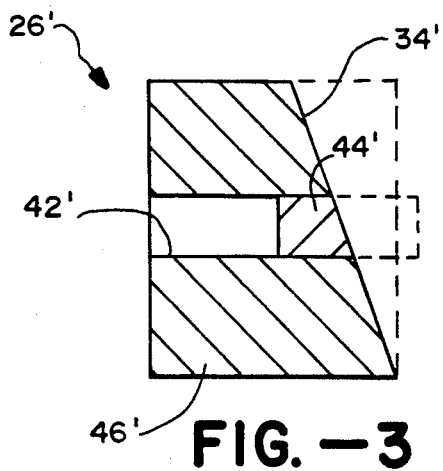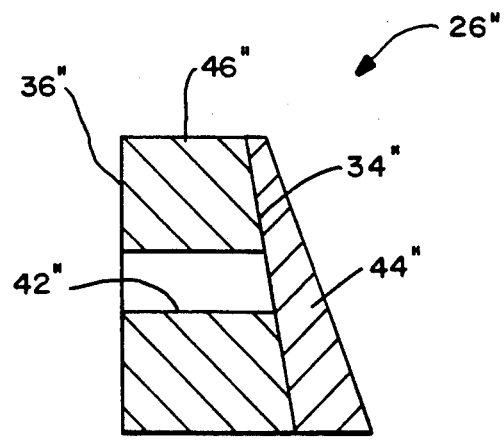

DYE LASER AMPLIFIER INCLUDING AN IMPROVED WINDOW CONFIGURATION FOR ITS DYE BEAM

The United States Government has rights in this invention pursuant to Contract No. w-7405-ENG-48 between the U.S. Department of Energy and the University of California, for the operation of Lawrence Livermore National Laboratory.

BACKGROUND OF THE INVENTION

The present invention relates generally to a dye laser amplifier of the type in which a continuously replenished supply of dye is excited with a first light beam in order to amplify the intensity of a second, different light beam passing through the continuously replenished dye. The present invention relates more particularly to a pair of specifically configured windows through which the second beam passes as the latter enters and exits the amplifier's dye cell containing the continuously replenished supply of dye.

A typical dye laser amplifier includes means defining the last mentioned dye cell through which a continuous stream of lasing dye is caused to pass a series of transparent windows into the chamber. Means are provided for directing the first beam or more than one such beam into the cell through cooperating windows while, at the same time, the second dye beam is caused to pass into and out of the same cell through its own cooperating windows.

In a dye laser amplifier of the general type just described, the pressure within its dye cell can be quite large when the amplifier is operated at relatively high flow rates and velocities. Therefore, the windows into this cell must be structurally sound, that is, they must be able to withstand the internal pressures therein without breaking, leaking or even deforming. This can be accomplished quite readily by making the windows relatively thick. However, the thicker the windows are made the more heat they tend to absorb from the passing light beams. At the same time, as the windows increase in temperature their refractive properties tend to change. In the case of those windows which serve to pass the dye beam, this change results in a lens effect which distorts the optical characteristics of the dye beam in a corresponding way.

One possible solution to the "window thickness" problem recited above is to make the dye beam windows only large enough to pass the dye beam itself. In this way, the windows could be made thinner than would be possible if they were substantially larger in surface area than the cross section of the dye beam. However, because the window, which is typically glass, is constructed of a different material than the rest of the dye cell defining means which forms part of the overall amplifier, a material-to-material juncture would be present within or in very close proximity to the cell. This, in turn, could result in undesired flow within the cell, as discussed in more detail in copending application Ser. No. 911,271, filed Sep. 22, 1986 and entitled HIGH FLOW VELOCITY DYE LASER AMPLIFIER. On the other hand, it may not be possible to make a larger window of the type in this application as thin as it should be without causing it to leak or fracture or even merely deform which could result in optical distortion of the dye beam passing therethrough.

SUMMARY OF THE INVENTION

In view of the foregoing, it is an object of the present invention to provide an uncomplicated and yet reliable way of solving the "thick window" problem recited above without having to resort to a small window configuration.

A more particular object of the present invention is to provide a dye beam window which is relatively large compared to the dye beam itself and yet a window which is sufficiently strong to withstand high internal pressures within its associated lasing chamber while, at the same time, contributing little to any optical distortion of the dye beam as the latter passes therethrough.

As indicated above, the dye laser amplifier disclosed herein is one in which a continuously replenished supply of dye is excited or pumped with a first light beam in order to amplify the intensity of a second, different light beam passing through the dye. To this end, the amplifier includes means defining a cell through which a continuous stream of the dye is caused to pass and in which dye beam amplification takes place, and a series of windows for accommodating passage of the beams. In accordance with the present invention, each of the windows intended to accommodate the dye beam is provided with a main body which is substantially larger in dimensions transverse to the path of the beam passing through it than the cross section of the dye beam itself. At the same time, this main body includes a first transverse section of given thickness through which the dye beam passes directly and a second transverse section of substantially greater thickness entirely surrounding the first section. In this way, the first section can be made relatively small (e.g., about the size of the dye beam's cross section) and relatively thin so as to minimize optical distortion in the dye beam and the second section can be made relatively thick in order to add structural integrity to the overall window. While it would be preferable from a performance standpoint for the window to be made as a single, integrally formed member, the two sections just mentioned are individually provided as integrally formed members for ease of manufacture.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The overall dye laser amplifier disclosed herein and particularly its dye beam windows will be described in more detail hereinafter in conjunction with the drawing wherein:

FIG. 1 is a side elevational view, in section, of a dye laser amplifier including dye beam windows designed in accordance with the present invention;

FIG. 2 is a perspective view of one of the dye beam windows forming part of the amplifier illustrated in FIG. 1, which window is designed in accordance with one embodiment of the present invention;

FIG. 3 is a side elevational view, in section, of a dye beam window designed in accordance with a second embodiment of the present invention; and FIG. 4 is a side elevational view, in section, of a dye beam window designed in accordance with a third embodiment of the present invention.

DETAILED DESCRIPTION OF THE INVENTION

Reference will now be made in detail to a preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning now to the drawings, attention is first directed to FIG. 1 which illustrates an overall dye laser amplifier generally indicated by the reference numeral 10. This amplifier includes a vertically extending stainless steel or like metal sleeve 12 which is coupled at its uppermost end to an inlet pipe 14 and at its bottom end to an outlet pipe 16. The sleeve itself defines an upper plenum arrangement 18, a diffuser arrangement 20 and a dye cell 22 and cell inlet 24 therebetween. For a more detailed description of upper plenum 18, cell 22 and its inlet 24, reference is made to the previously recited copending U.S. patent application Ser. No. 911,271. For purposes of the present invention it suffices to say that the lateral boundaries of dye cell 22 and its inlet 24 are defined by four transparent windows, the opposing windows 26 shown in FIG. 1, the window 28 and another window (not shown) in confronting relationship with window 28.

From an operational standpoint, a continuous stream of dye is caused to pass through cell 22 from inlet pipe 14 to outlet pipe 16 at a relatively high flow rate, again as described more fully in the last mentioned copending patent application. In passing through cell 22, the dye passes over the internal surfaces of windows 26 and 28. At the same time, the dye, as it enters cell 22, is excited or pumped by means of a pair of pump beams, for example copper vapor laser beams, which are directed into the cell through windows 28. As this occurs, a dye beam is directed into the dye cell through one of the windows 26, as indicated by arrow 30, and back out of the chamber through the opposite window 26, as indicated by the arrow 32. As the beam passes through the dye cell it is amplified in a known manner but otherwise is intended to retain all of its original optical characteristics.

The various components making up overall dye laser amplifier 10, as described above, with the exception of windows 26, are either known in the art or discussed in sufficient detail in the above mentioned copending patent application and hence will not be discussed any further herein. On the other hand, the dye beam windows 26 are designed in accordance with the present invention to provide sufficient structural integrity to withstand the internal pressures within chamber 22 while, at the same time, adding, at most, minimal optical distortion to the dye beam as the latter passes through the windows and the dye within the cell, as will be described below.

Turning to FIG. 2, attention is directed to an enlarged view of one of the dye beam windows shown in FIG. 1, specifically the one through which the dye beam leaves cell 22. As seen there, this window includes a transparent main body 33 which is integrally formed as a single unit from suitable material, for example fused quartz or other suitable optical material. Main body 33 is generally trapezoidal in cross sectional configuration and includes an innermost overall surface 34, e.g., the surface within cell 22, an opposite outermost surface 36 and top and bottom walls 38 and 40, respectively. A blind passageway 42 extends into main body 33 from a point on outer surface 36 and stops short of surface 34. With main body 33 configured in this way, it may be divided into two functional sections, a first relatively thin section 44 (directly in front of passageway 42) and a substantially thicker section 46 which surrounds section 44 in its entirety. Section 44 is intended to pass dye beam 30 directly and therefore this section is the same size in transverse dimensions as or at most slightly larger in transverse dimensions than the cross section of beam 30. Section 44 is as thin as possible while deflecting a small fraction of the wavelength of the dye beam and still being able to withstand the internal pressures within chamber 28. Therefore it adds minimal optical distortion to the beam. At the same time, section 46 which is not directly impinged upon by the dye beam is sufficiently thick to add the needed structural integrity to the overall window to withstand the internal pressures of chamber 22. Because the dye beam does not pass through section 46, the latter can be made as thick as necessary (and practical) without fear of adversely affecting the optical characteristics of the beam.

For the reasons discussed in the above mentioned copending patent application, it is desirable to make the internal surfaces of windows 26 and 28 as smooth as possible. As a result, it is preferable if windows 26 are constructed of single, integrally formed units, as illustrated in FIG. 2. However, from a practical manufacturing standpoint, it is desirable to fabricate the individual sections 44 and 46 from separate components which are themselves integrally formed members. One such window is illustrated in FIG. 3 at 26'. The only difference between this window and the one shown in FIG. 2 is that section 44 forming part of window 26 is in the form of a separate plug 44' in window 26' and the rest of this latter window which is designated by the reference numeral 46' is an integrally formed unit corresponding in function to section 46.

In a preferred embodiment of the present invention, the material making up plug 44', for example glass, is identical to the material making up section 46'. Moreover, the passageway into section 46', indicated at 42', does not initially stop short of the internal surface of window 26', which surface is indicated at 34' but rather extends entirely through section 46'. In this way, plug 44' may be placed into position from surface 34'. Moreover, in order to provide a tight, reliable fit, the passageway 42' tapers inwardly slightly in the direction away from surface 34' and the plug 44' includes a corresponding taper. Thus, after the plug is inserted in place, any internal pressure placed on the plug will cause it to sit tighter within the passage and thereby reduce the possibility of leakage between the two members. Once the plug 44' is in place, the entire surface 34' is polished so as to make the joint between the two components as smooth as possible.

Having described overall window 26', attention is now directed to a preferred way of fabricating this window when the latter is angled, as shown, which may be desirable as disclosed in the previously recited application. At the outset, a full rectangular block of glass or other such material to be used as the window is provided, as indicated by the dotted lines in FIG. 3. A full passageway 42' is provided through the entire block and a plug substantially longer than plug 44' is provided, as also shown by dotted lines. The plug is inserted into passageway 42' as far as it will go. Thereafter, the block is cut so as to provide the desired angle of surface 34'. Thereafter, this latter is surface is polished, as stated above.

Another two-piece window is shown in FIG. 4 at 26". This window includes a main section 46" having a through-hole or passageway 42" extending from one side 36" to the opposite side 34" of the main section. As seen in FIG. 4, side 34" is inclined relative to passageway 42" in the same way as sides 34 and 34' but side 36 is not. Window 26" also includes a second section 44" which is trapezoidal in cross section and which is sized to fit over side 34" whereby to entirely cover passageway 42". Section 44" is bonded into the position shown by a suitable bonding substance and thereby functions in the same manner as windows 26 and 26' to provide a thin window section for passage of beam 30 and a larger outer section for structural integrity.

While three embodiments of the invention have been shown and described, further embodiments or combinations of those described herein will be apparent to those skilled in the art without departing from the spirit of the invention.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a dye laser amplifier in which a continuously replenished supply of dye is excited with a first light beam in order to amplify the intensity of a second different light beam passing therethrough, said amplifier including means defining a cell through which a continuous stream of said dye is caused to pass, means for directing said first beam into said cell and means for directing said second beam into and through said cell, the improvement comprising a pair of specifically configured windows through which said second beam passes along fixed paths as the latter enters and exits said cell, each of said windows having a main body of a given material which is substantially larger in dimensions transverse to its beam path than the cross section of the second beam itself, said main body including a first transverse section of given thickness through which said second beam passes directly and a second transverse section of substantially greater thickness entirely surrounding said first section, said second section of said main body including an opening throughout its entire thickness and at lest as large in cross section or larger than the cross section of said beam, said opening being disposed in alignment with said first section, whereby said beam passes through said opening and said first section without passing through said second section.

2. In a dye laster amplifier in which a continuously replenished supply of dye is excited with a first light beam in order to amplify the intensity of a second different light beam passing therethrough, said amplifier including means defining a cell through which a continuous stream of said dye is caused to pass, means for directing said first beam into said cell and means for directing said second beam into and through said cell, the improvement comprising a pair of specifically configured windows through which said second beam passes along fixed paths as the latter enters and exits said cell, each of said windows having a main body which is substantially larger in dimensions transverse to its beam path than the cross section of the second beam itself, said main body including a first transverse section of given thickness through which said second beam passes directly and a second transverse section of substantially greater thickness entirely surrounding said first section, said second section of said main body being a single, integrally formed member having a through-hole corresponding in size to and in the location of said first section and said first section being a single, integrally formed member disposed within said through-hole.

3. In a dye laser amplifier in which a continuously replenished supply of dye is excited with a first light beam in order to amplify the intensity of a second different light beam passing therethrough, said amplifier including means defining a cell through which a continuous stream of said dye is caused to pass, means for directing said first beam into said cell and means for directing said second beam into and through said cell, the improvement comprising a pair of specifically configured windows through which said second beam passes along fixed paths as the latter enters and exits said cell, each of said windows having a main body which is substantially larger in dimensions transverse to its beam path than the cross section of the second beam itself, said main body including a first transverse section of given thickness through which said second beam passes directly and a second transverse section of substantially greater thickness entirely surrounding said first section, said second section of said main body being a single, integrally formed first member having opposite sides and through-hole extending between said sides and corresponding in size to and in the location of said first section and said first section being a part of a single, integrally formed second member fixedly disposed against one of said sides of said first member over one end of said through-hole.

4. The improvement according to claim 1 wherein said first body section is the same size in transverse dimensions as, or at most slightly larger in transverse dimensions than, the cross section of said second beam.

5. The improvement according to claim 1 wherein said main body including its first and second sections is a single, integrally formed member.

6. The improvement according to claim 2 wherein each of said windows includes an inner surface within said chamber and an opposite outer surface and wherein each first body section tapers inwardly in the direction of the outer surface of its window.

7. The improvement according to claim 6 wherein the first and second sections of each window together define a smooth overall inner surface.

8. The improvement according to claim 7 wherein said windows are constructed of glass.

9. The improvement according to claim 7 wherein said first body section is the same size in transverse dimensions as, or at most slightly larger in transverse dimensions than, the cross section of said second beam.

10. The improvement according to claim 1 wherein said first body section is as thin as possible without bending structurally due to internal pressures within said chamber.

11. The improvement according to claim 10 wherein said first body section is the same size in transverse dimensions as, or at most slightly larger in transverse dimensions than, the cross section of said second beam.

12. The improvement according to claim 3 wherein each of said windows includes an inner surface within said chamber and an opposite outer surface and wherein each first body section tapers inwardly in the direction of the outer surface of its window.

13. The improvement according to claim 3 wherein said second member is trapezoidal in cross section.

* * * * *